United States Patent
Yoon et al.

(10) Patent No.: US 10,384,947 B2
(45) Date of Patent: Aug. 20, 2019

(54) SUBSTRATE HAVING AT LEAST ONE PARTIALLY OR ENTIRELY FLAT SURFACE AND USE THEREOF

(71) Applicant: INTELLECTUAL DISCOVERY CO., LTD., Samseong-ro, Gangnam-gu, Seoul (KR)

(72) Inventors: Kyung Byung Yoon, Jongno-gu Seoul (KR); Cao Thanh Tung Pham, Mapo-gu Seoul (KR); Hyun Sung Kim, Yeongdeungpo-gu Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 145 days.

(21) Appl. No.: 15/606,987

(22) Filed: May 26, 2017

(65) Prior Publication Data
US 2017/0260058 A1 Sep. 14, 2017

Related U.S. Application Data

(62) Division of application No. 14/408,139, filed as application No. PCT/KR2012/004724 on Jun. 15, 2012, now abandoned.

(51) Int. Cl.
*B01J 29/06* (2006.01)
*C01B 39/02* (2006.01)
(Continued)

(52) U.S. Cl.
CPC .......... *C01B 39/023* (2013.01); *B01D 53/228* (2013.01); *B01D 61/007* (2013.01);
(Continued)

(58) Field of Classification Search
USPC ........................................ 502/60, 62, 64, 85
See application file for complete search history.

(56) References Cited

U.S. PATENT DOCUMENTS

| 5,952,243 A | 9/1999 | Forester et al. |
| 7,357,836 B2 * | 4/2008 | Tsapatsis ........... B01D 67/0051 117/68 |

(Continued)

FOREIGN PATENT DOCUMENTS

| JP | H10510399 | 10/1998 |
| JP | 2000026115 | 1/2000 |

(Continued)

OTHER PUBLICATIONS

International Search Report for PCT/KR2012/004724, English translation attached to original, Both completed by the Korean Patent Office dated Feb. 20, 2013, All together 5 Pages.

(Continued)

*Primary Examiner* — James E McDonough
(74) *Attorney, Agent, or Firm* — Brooks Kushman P.C.

(57) ABSTRACT

A method for preparing a thin or thick film, including the aligning non-spherical seed crystals on a flat portion of at least one surface of the substrate such that an a-axis, a b-axis, and/or a c-axis are oriented according to a certain rule; and exposing the aligned seed crystals to a solution for enabling the growth of the seed crystals to thereby form and grow a film from the seed crystals using a secondary growing technique.

17 Claims, 5 Drawing Sheets

(51) Int. Cl.
| | |
|---|---|
| *C01B 39/38* | (2006.01) |
| *B01D 69/10* | (2006.01) |
| *B01D 53/22* | (2006.01) |
| *B01D 61/00* | (2006.01) |
| *B01D 67/00* | (2006.01) |
| *B01D 71/02* | (2006.01) |
| B01J 29/04 | (2006.01) |
| B01J 29/87 | (2006.01) |

(52) U.S. Cl.
CPC ......... *B01D 67/0051* (2013.01); *B01D 69/10* (2013.01); *B01D 71/028* (2013.01); *C01B 39/38* (2013.01); *B01D 2323/00* (2013.01)

(56) References Cited

U.S. PATENT DOCUMENTS

| | | | |
|---|---|---|---|
| 8,153,099 B2* | 4/2012 | Yoon | B01D 67/0051 423/704 |
| 2012/0114920 A1* | 5/2012 | Yoon | B81C 1/00373 428/204 |
| 2013/0216772 A1* | 8/2013 | Yoon | B01D 67/0051 428/131 |

FOREIGN PATENT DOCUMENTS

| | | |
|---|---|---|
| JP | 2002121087 | 4/2002 |
| JP | 2002368082 | 12/2002 |
| JP | 2003238147 | 8/2003 |
| JP | 2004344755 | 12/2004 |
| JP | 2005028248 | 2/2005 |
| JP | 2013538779 | 10/2013 |
| KR | 1019990028284 | 4/1999 |
| KR | 20090120846 | 11/2009 |
| KR | 20110064318 | 6/2011 |
| KR | 20120025806 | 3/2012 |
| WO | 9701864 | 1/1997 |
| WO | 2010117228 | 10/2010 |
| WO | 2010117229 | 10/2010 |
| WO | 2012033347 | 3/2012 |

OTHER PUBLICATIONS

Cao et al. Science Dec. 16, 2011, vol. 334, All together 53 Pages, "Growth of Uniformly Oriented Silica MFI and BEA Zeolite Films on Substrates."

Lai et al. Advanced Functional Materials Jul. 2004, vol. 14, No. 7, p. 716-729, "Siliceous ZSM-5 Membranes by Secondary Growth of b-Oriented Seed Layers."

Gump et al. Ind. Eng. Chem. Res. 2001, vol. 40, p. 565-577, "Aromatic Permeation throuh Crystalline Molecular Sieve Membranes."

Hedlund et al. Journal of Membrane Science 2003, vol. 222, p. 163-179, "A masking technique for high quality MFI membranes."

Daramola et al. Separation Science and Technology 2010, vol. 45, p. 21-27, "Xylene Vapor Mixture Separation in Nanocomposite MFI-Alumina Tubular Membranes: Influencce of Operating Variables."

Japanese Office Action for Japanese Application No. JP2015-517156, English Translation attached to original, Office Action dated Nov. 24, 2015, All together 11 Pages.

* cited by examiner

SUBSTRATE HAVING AT LEAST ONE PARTIALLY OR ENTIRELY FLAT SURFACE AND USE THEREOF

CROSS-REFERENCE TO RELATED APPLICATIONS

This application is a division of U.S. application Ser. No. 14/408,139 filed Feb. 3, 2015, which is the U.S. national phase of PCT Application No. PCT/KR2012/004724 filed Jun. 15, 2012, the disclosures of which are incorporated in their entirety by reference herein.

TECHNICAL FIELD

The present invention relates to a substrate, at least one surface of which is partially or entirely flat, and to a method of preparing a thin film or a thick film using the same.

BACKGROUND

Zeolites are crystalline aluminosilicates having angstrom-scale pores and channels in their crystal lattice. Because sites around aluminum in the framework of aluminosilicate bear negative charges, cations for charge balancing are present in the pores, and the remaining space in the pores is usually filled with water molecules. The structure, shape and size of the three-dimensional pores in zeolites vary depending on the type of zeolite, but the diameter of the pores usually corresponds to the molecular size. Thus, a zeolite is also called "molecular sieve", because it has size selectivity or shape selectivity for molecules entering the pores depending on the type of zeolite.

Meanwhile, zeotype molecular sieves are known in which silicon (Si) and aluminum (Al) atoms constituting the framework structure of zeolite are partially or wholly replaced by various other elements. Examples of known zeotype molecular sieves include porous silicalite-based molecular sieves free of aluminum, $AlPO_4$-based molecular sieves in which silicon is replaced by phosphorus (P), and other zeotype molecular sieves obtained by substituting a portion of the framework of such zeolite and zeotype molecular sieves with various metal atoms such as Ti, Mn, Co, Fe and Zn. These zeotype molecular sieves are materials derived from zeolites, and do not belong to the zeolite group based on the mineralogical classification, but are commonly called zeolites in the art.

Accordingly, the term "zeolite" as used herein is meant to include the above-mentioned zeotype molecular sieves in a broad sense.

Meanwhile, a zeolite having an MFI structure is one of the most actively used zeolites and include the following types:

1) ZSM-5: MFI zeolite in which silicon and aluminum are present in a specific ratio;

2) Silicalite-1: zeolite composed only of silica; and

3) TS-1: MFI zeolite in which aluminum sites are partially replaced by titanium (Ti).

The structure of an MFI zeolite is shown in FIGS. 1A and 1B. In the MFI zeolite, approximately elliptical pores (0.51 nm×0.55 nm) are connected in a zigzag configuration to form channels extending in the a-axis direction, and approximately circular pores (0.54 nm×0.56 nm) linearly extend in the b-axis direction to form linear channels. No channels remain open in the c-axis direction.

Another zeolite, beta (BEA), adopts a truncated bipyramidal shape, with 6.6×6.7 Å channels running straight along the a- (or b-) axis and 5.6×5.6 Å channels running tortuously along the c-axis (FIG. 1C).

Powdery MFI zeolites are very widely used in household and industrial applications, including petroleum cracking catalysts, adsorbents, dehydrating agents, ion exchangers, gas purifiers, etc., meanwhile MFI zeolite thin films formed on porous substrates, such as porous alumina, are widely used as membranes for separating molecules through which molecules can be separated on the basis of size. Furthermore, MFI zeolite thin films can be used in a wide range of applications, including second- and third-order nonlinear optical thin films, three-dimensional memory materials, solar energy storage devices, electrode auxiliary materials, carriers of semiconductor quantum dots and quantum wires, molecular circuits, photosensitive devices, luminescent materials, low dielectric constant (k) thin films, anti-rusting coatings, etc.

As described above, the pore shape, size and channel structure of MFI zeolites vary depending on the crystal direction Meanwhile, methods for producing MFI zeolite thin films on substrates such as glass plates are broadly divided into a primary growth method and a secondary growth method. According to the primary growth method, a substrate is soaked in a gel for the synthesis of MFI zeolite without any pretreatment, and then spontaneous growth of an MFI zeolite film on the substrate is induced. The synthetic gel used herein usually contains tetrapropylammonium hydroxide (TPAOH). In this case, b-axis-oriented MFI zeolite crystals grow perpendicular to the glass substrate at the initial stage of the reaction. However, a-axis oriented crystals begin to grow subordinately from central portions of most of the crystals grown on the glass plate. In addition, with the passage of time, the crystals grow in various directions, and as a result, the final thin film has various orientations. The randomly-oriented MFI zeolite thin film is useful in some applications, but its applicability is limited. Particularly, when the randomly oriented MFI zeolite thin film is applied as a membrane for the separation of molecules, the molecular permeability, which is one of the most important factors in molecular separation, is markedly reduced. When organic bases other than TPAOH are used in the primary growth method, no MFI zeolite thin film grows on the substrate. To overcome such problems, the secondary growth method is used.

In the secondary growth method, a substrate having MFI zeolite crystals attached thereto is soaked in an MFI zeolite synthetic gel, and then allowed to react to form an MFI zeolite thin film. Herein, the MFI zeolite crystals attached to the substrate act as seed crystals. The orientation of the MFI zeolite crystals attached to the substrate plays a very important role in determining the orientation of the MFI zeolite thin film to be produced later. For example, when the a-axes of the MFI zeolite seed crystals are oriented normal to the substrate, the a-axes of the MFI zeolite thin film formed therefrom tend to be oriented normal to the substrate, and when the b-axes of the MFI zeolite seed crystals are oriented normal to the substrate, the b-axes of the MFI zeolite thin film formed therefrom tend to be oriented normal to the substrate.

Throughout the specification, a number of publications and patent documents are referred to and cited. The disclosure of the cited publications and patent documents is incorporated herein by reference in its entirety to more clearly describe the state of the related art and the present disclosure.

SUMMARY

Technical Problem

When the preparation of a thin film or a thick film is performed by using a secondary growth method after aligning non-spherical seed crystals such as MFI zeolite crystals on a substrate, the surface of the substrate should be flat for the alignment of the non-spherical seed crystals so that one or more or all of the a-axis, b-axis, and c-axis of the non-spherical seed crystals can be oriented according to a predetermined rule.

Therefore, it is an object of the present invention to provide a porous substrate, the surface of which is flat so that one or more or all of the a-axis, b-axis, and c-axis of the non-spherical seed crystals can be oriented according to a predetermined rule, and on which a thin film or thick film that may be used as a membrane for molecular separation can be formed.

Technical Solution

In accordance with a first aspect of the present invention, there is provided a substrate, at least one surface of which is partially or entirely flat, comprising: a substrate formed by first substrate-forming particles; second substrate-forming particles filled in for filling some or all of first pores generated among the first substrate-forming particles placed on at least one surface of the substrate; and a polymer filled in for filling some or all of second pores remaining in a portion filled with the second substrate-forming particles.

In accordance with a second aspect of the present invention, there is provided a substrate complex comprising: a substrate according to the present invention; and non-spherical seed crystals aligned on a flat portion of at least one surface of the substrate such that one or more or all of a-axes, b-axes, and c-axes of the seed crystals are oriented according to a predetermined rule.

In accordance with a third aspect of the present invention, a method for preparing a thin film or a thick film, the method comprising the steps of: (1) aligning non-spherical seed crystals on a flat portion of at least one surface of a substrate according to the present invention such that one or more or all of a-axis, b-axis and c-axis of the seed crystals are oriented according to a predetermined rule; and (2) exposing the aligned seed crystals to a solution for seed crystal growth, and forming and growing the film from the seed crystals by a secondary growth method and a film prepared by the above method.

Hereinafter, the present invention will be described in detail.

In the specification, the relationship between the a-, b- and c-axes of crystals is that the c-axis does not lie in a plane formed by the a-axis and the b-axis of crystals. For example, the a-, b- and c-axes of crystals may be perpendicular to one another, or the c-axis may be at an angle with respect to the plane formed by the a-axis and the b-axis of crystals.

In order to align one or more or all of the a-axis, b-axis, and c-axis of the non-spherical seed crystals according to a predetermined rule during arranging the non-spherical seed crystals, the surface of the substrate should be flat. If not so, the axes of the seed crystals will be inclined at random angles in random directions by depressions and projections on the substrate. In addition, when the thin film or thick film formed on the substrate is to be used as a membrane for separation, the substrate is preferably a porous substrate.

Therefore, in order to provide a substrate having at least one flat surface, the substrate according to the present invention comprising: a substrate formed by first substrate-forming particles; second substrate-forming particles filled in for filling some or all of first pores generated among the first substrate-forming particles placed on at least one surface of the substrate; and a polymer filled in for filling some or all of second pores remaining in a portion filled with the second substrate-forming particles.

The substrate according to the present invention may be prepared by placing the second substrate-forming particles on the surface of the substrate formed by the first substrate-forming particles, applying pressure to the second substrate-forming particles to be insert into the first pores generated among the first substrate-forming particles, followed by calcination, coating the surface of the calcined substrate with a solution of the polymer, and heating the polymer-coated substrate to evaporate the solvent or cure the polymer.

The polymer filling some or all of the second pores is removed later by a process such as calcination so that the thin film or thick film formed on the substrate may be used as a membrane for separation.

The average particle diameter of the first substrate-forming particles is preferably greater than that of the second substrate-forming particles. The sizes of the first substrate-forming particles and the second substrate-forming particles are not limited, but may be in the order of micrometers or nanometers depending on the intended use.

Because the second substrate-forming particles are injected into the surface of the substrate formed by the first substrate-forming particles by applying the physical pressure, the second substrate-forming particles are mainly disposed on the surface of the substrate.

In the substrate according to the present invention, one or more second substrate-forming particles fill each of the first pores generated among the first substrate-forming particles to reduce the size of surface depressions and projections formed by the first substrate-forming particles.

Thereafter, some or all of second pores remaining in a portion filled with the second substrate-forming particles are filled with a polymer, thereby forming a smooth and flat surface.

The first substrate-forming particles and the second substrate-forming particles may be the same or different materials.

Non-limiting examples of the materials of the first substrate-forming particles and the second substrate-forming particles include: (i) oxides that comprise one or more metal and non-metal elements, and have a hydroxyl group on a surface thereof; (ii) single metals or metal alloys, which form a bond with a thiol group (—SH) or an amine (—NH2) group; (iii) polymers having a functional group on a surface thereof; (iv) semiconductor compounds; or (v) zeolites or zeotype molecular sieves thereof, or a combination thereof.

The first substrate-forming particles and the second substrate-forming particles are preferably independently selected from ordered porous materials in order to prevent the substrate from interfering with the function as a membrane for separation of the thin film or thick film formed thereon. In an example of the present invention, porous silica was used as the first substrate-forming particles and the second substrate-forming particles.

Meanwhile, non-limiting examples of the polymer include natural polymers, such as cellulose, starches (amylase and amylopectin) and lignin, synthetic polymers, and conductive polymers. The kind and molecular weight of polymers are not limited, as long as the polymer can be dissolved in a solvent and can fill some or all of the second pores. The polymer is preferably a polymer that has a hydroxyl group on the surface or can be treated to have a hydroxyl group. This is because this polymer can increase the adhesion of seed crystals to the substrate of the present invention.

In addition, a method for preparing a thin film or a thick film according to the present invention comprises: (1) aligning non-spherical seed crystals on a flat portion of at least one surface of a substrate according to the present invention such that one or more or all of a-axis, b-axis and c-axis of the seed crystals are oriented according to a predetermined rule; and (2) exposing the aligned seed crystals to a solution for seed crystal growth, and forming and growing the film from the seed crystals by a secondary growth method.

The seed crystals are preferably selected from ordered porous materials.

The seed crystals used in the present invention and the framework components of a film formed therefrom are not specifically limited.

The seed crystals and the formed film may be a zeolite or a zeotype molecular sieve. In addition, the seed crystals and the formed film may have an MFI structure.

As used herein, the term "zeolite" not only refers collectively to (i) minerals such as aluminum silicate hydroxides of alkali or alkaline earth metals, but also includes (ii) zeotype molecular sieves obtained by replacing part or all of silicon (Si) and aluminum (Al) atoms of the framework of zeolites by various other elements, and also includes all porous oxides and sulfides having hydroxyl groups on surface thereof in a broad sense.

As used herein, the term "molecular sieve" refers to a porous material that can separate molecules having different sizes from a mixture.

Examples of MFI zeolites or zeotype molecular sieves include ZSM-5, silicalite, TS-1, AZ-1, Bor-C, boralite C, encilite, FZ-1, LZ-105, monoclinic H-ZSM-5, mutinaite, NU-4, NU-5, TSZ, TSZ-III, TZ-O1, USC-4, USI-108, ZBH, ZKQ-IB and the like.

Other examples of seed crystals are disclosed in Korean Patent Laid-Open Publication No. 2009-120846 and U.S. Pat. No. 7,357,836.

Meanwhile, step (1) of the method for preparing a thin film or a thick film according to the present invention is characterized in that non-spherical seed crystals that are to be used as templates for secondary growth are aligned on a substrate such that one or more or all of the a-axis, b-axis and c-axis of the crystals are oriented according to a predetermined rule.

Non-spherical silicalite-1 or zeolite beta seed crystals that are used in the present invention are ordered porous materials having channels running along the a-axis, b-axis and/or c-axis in the crystals (FIGS. 1A, 1B and 1C).

For example, the seed crystals may be aligned on the substrate in a manner such that all the a-axes of the seed crystals are oriented parallel to one another, all the b-axes of the seed crystals are oriented parallel to one another, or all the c-axes of the seed crystals are oriented parallel to one other, or a combination thereof.

Moreover, the seed crystals may be aligned on the substrate such that the a-, b- or c-axes are oriented normal to the surface of the substrate.

Meanwhile, seed crystals, aligned on a substrate such that one or more or all of the a-, b- and c-axes of the seed crystals are oriented according to a predetermined rule, and preferably form a monolayer (FIGS. 1A, 1B and 1C).

After the seed crystals are placed on the substrate, the orientation of the a-axes, b-axes or c-axes of the seed crystals can be aligned by physical pressure.

Korean Patent Laid-Open Publication No. 2009-120846 discloses a method of vertically orienting all the b-axes of MFI-type seed crystals on a substrate, and a technology capable of controlling the orientation of the a-, b- and/or c-axes of crystals on a substrate are disclosed in PCT/KR2010/002180 and PCT/KR2010/002181. Thus, seed crystals, aligned such that at least one or all of the a-, b- and c-axes of the seed crystals are oriented, can be prepared according to the methods described in Korean Patent Laid-Open Publication No. 2009-120846, PCT/KR2010/002180 and PCT/KR2010/002181 or using a modification of these methods.

Specifically, seed crystals, aligned on a substrate in step (1) such that all the a-, b- and c-axes thereof are oriented, can be prepared by the following processes:

Process 1

A process comprising the steps of:

A) preparing a substrate, the surface of which has formed thereon depressions or projections capable of fixing the position and orientation of seed crystals; and B) placing seed crystals on the substrate, and then applying physical pressure to the seed crystals to insert a portion or the whole of each seed crystal into each of pores defined by the depressions or the projections.

Process 2

A process comprising the steps of:

(A) preparing a template, the surface of which has formed thereon depressions or projections capable of fixing the position and orientation of seed crystal;

(B) placing seed crystals on the template, and then applying physical pressure to the seed crystals to insert a portion or the whole of each seed crystal into each of pores defined by the depressions or the projections to thereby align the seed crystals on the template; and (C) bringing the template having the seed crystals aligned thereon into contact with a substrate to transfer the seed crystals onto the substrate.

In the above processes, the shape of the pore preferably corresponds to the shape of a specific portion of each seed crystal which is inserted into the pore in order to control the orientations of the seed crystals.

Also, the physical pressure may be applied by rubbing or pressing against the substrate.

Meanwhile, the substrate or the template can form hydrogen bonds, ionic bonds, covalent bonds, coordination bonds or van der Waals bonds with the seed crystals by the physical pressure applied.

The depressions or projections formed on the surface of the substrate or the template can be printed directly on the substrate, formed using a photoresist, formed by laser ablation after coating with a sacrificial layer, or formed by inkjet printing.

Although photoresists or ink may be removed after aligning the seed crystals on the substrate, it may also be present as a support for the seed crystals during the secondary growth process. The seed crystals aligned on the substrate in step (1) may be in contact with or spaced apart from the seed crystals adjacent thereto; however, photoresist or ink is required to have a sufficient thickness so as to act as a support for the seed crystals during the secondary growth process, and for this reason, the seed crystals are preferably spaced apart from one other.

Before step (1), a coupling agent capable of binding to the substrate and the seed crystals may be applied to the substrate surface. As used herein, the term "coupling agent" refers to any compound having an end functional group, which enables coupling between the substrate and the seed crystals. Preferred coupling agents and the mechanisms of action and applications thereof are disclosed in Korean Patent Laid-Open Publication No. 2009-120846 and U.S. Pat. No. 7,357,836.

In step (2) of the method according to the present invention, secondary growth of the seed crystals in step (2) allows to be connected to one another two-dimensionally while growing vertically from the surface thereof to form a three-dimensional structure, thereby forming the film.

Herein, because the seed crystals such as silicalite-1 or zeolite beta seed crystals, which are ordered porous materials, have channels formed therein, the channels in the seed crystals can extend to a film formed from the seed crystals.

The film, formed in an area in which the orientations of at least one of the axes of seed crystals adjacent to one another are uniform, may have: (a) channels that are continuously connected to one another and extend in an axial direction parallel to the substrate surface; (b) channels that are continuously connected to one another and extend in an axial direction perpendicular or inclined with respect to the substrate surface; or (c) both of them.

In step (2) of the method, crystal nucleation in a solution for crystal growth or on the seed crystal surface preferably does not occur.

A solvent in the solution for seed crystal growth used in step (2) may be water or an organic solvent.

The solution for seed crystal growth used in step (2) preferably comprises a structure-directing agent.

As used herein, the term "structure-directing agent" refers to a material that acts as a template for a specific crystalline structure. The charge distribution, size and geometric shape of the structure-directing agent provide its structure-directing properties. The structure-directing agent used in step (2) of the method of the present invention is preferably selected from among those that induce only secondary growth from the surface of seed crystals and that do not induce crystal nucleation in a solution for seed crystal growth or on the surface of seed crystals. The crystal growth rate along each crystal axis is not critical, as long as crystal nucleation is not inducted.

Seed crystals used in step (1) of the method of the present invention can also be formed using a seed structure-directing agent. Because the use of the seed structure-directing agent induces crystal nucleation, it is not preferred to use the seed structure-directing agent as a structure-directing agent in step (2). Thus, the structure-directing agent (SDA) in the solution for seed crystal growth used in step (2) preferably differs from the seed structure-directing agent.

When the seed crystals and the formed film are a zeolite or a zeotype molecular sieve, the structure-directing agent used in step (2) may be an amine, an imine or a quaternary ammonium salt. Preferably, the structure-directing agent may be a quaternary ammonium salt represented by the following Formula 1 or an oligomer having the salt as a repeat unit:

Formula 1

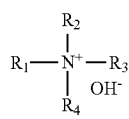

wherein $R_1$, $R_2$, $R_3$ and $R_4$ are independently a hydrogen atom or a $C_1$-$C_{30}$ alkyl, aralkyl or aryl group that may contain oxygen, nitrogen, sulfur, phosphorus or metal atom as heteroatom. The number of the repeat units in the oligomer may be 2-10, and preferably 2-4.

The term "$C_1$-$C_{30}$ alkyl" in Formula 1 represents a linear or branched-chain saturated hydrocarbon group having 1 to 30 carbon atoms, and examples thereof include methyl, ethyl, propyl, isobutyl, pentyl, hexyl, heptyl, octyl, nonyl, decyl, undecyl, tridecyl, pentadecyl and heptadecyl. Preferably, the alkyl group is a $C_1$-$C_4$ linear or branched alkyl group.

The term "aralkyl" represents an aryl group bonded to a structure composed of one or more alkyl groups, and is preferably benzyl.

The term "aryl" represents a wholly or partially unsaturated, substituted or unsubstituted monocyclic or polycyclic carbon ring, and is preferably monoaryl or biaryl. Preferably, monoaryl has 5 to 6 carbon atoms, and biaryl has 9 to 10 carbon atoms. Most preferably, the aryl is substituted or unsubstituted phenyl.

Meanwhile, when the seed crystals and the formed film are a zeolite or a zeotype molecular sieve, the solution for seed crystal growth used in step (2) may comprise, in addition to the structure-directing agent, the following materials:

1) aluminum (Al) materials, for example, organic-inorganic composite materials (e.g., aluminum isopropoxide) composed of aluminum and an organic material bonded thereto, aluminum salts (e.g., aluminum sulfate), pure aluminum materials in the form of powder or lump, aluminum oxides (e.g., alumina), etc.;

2) silicon (Si) materials, for example, organic-inorganic composite materials (e.g., tetraethylorthosilicate (TEOS)) composed of silicon and an organic material bonded thereto, silicon salts (e.g., sodium silicalite), pure silicon materials in the form of powder or lump, glass powders, silicon oxides (e.g., quartz), etc.;

3) fluorine (F) materials, for example, all types of materials containing F (e.g., HF, $NH_4F$, NaF and KF); and 4) materials that are used to incorporate elements other than aluminum and silicon into the framework of zeolites.

In a preferred embodiment of the present invention, the solution for seed crystal growth of zeolites or zeotype molecular sieves has a composition of [TEOS]X[TEAOH]Y[$(NH_4)_2SiF_6$]Z[$H_2O$]W. In the composition, the content ratio of X:Y:Z:W is (0.1-30) : (0.1-50) : (0.01-50) : (1-500), preferably (0.5-15) : (0.5-25) : (0.05-25) : (25-400), more preferably (1.5-10) : (1.0-15) : (0.1-15) : (40-200), and most preferably (3-6) : (1.5-5) : (0.2-5) : (60-100).

In the method of the present invention, the solution for seed crystal growth of a zeolite or a zeotype molecular sieve may further comprise, other than the above composition, transition metals such as titanium, Group 13 elements such as gallium, and Group 14 elements such as germanium, but is not limited thereto. The proportion of the additional component is limited to 0.1 to 30.

In the method of the present invention, the temperature of a reaction for film formation and growth may vary from 50° C. to 250° C. depending on the composition of seed crystal growth solution used or the material to be prepared. The reaction temperature is preferably 80° C. to 200° C., and more preferably 120° C. to 180° C. In addition, the reaction temperature doesn't have to be fixed during the whole process, but can be changed stepwise during the reaction.

In the method of the present invention, the time of the reaction for film formation and growth may vary from 0.5 hours to 20 days. The reaction time is preferably 2 hours to 15 days, more preferably 6 hours to 2 days, and most preferably 10 hours to 1 day.

The film prepared according to the present invention can be used in various applications, including membranes for molecular separation, low dielectric materials in the semiconductor industry, nonlinear optical materials, membranes for water electrolysis, thin films for solar cells, optical parts, interior and exterior parts for aircrafts, cosmetic containers, household containers, mirrors, and other membranes utilizing the characteristics of nanopores of zeolites, but is not limited thereto.

Advantageous Effects

When the substrate having a flat surface according to the present invention is used, one or more or all of the a-axis, b-axis and c-axis of non-spherical seed crystals can be oriented according to a predetermined rule, and a zeolite-based thin film or thick film formed on the substrate can be used as a membrane for molecular separation.

In addition, when the substrate having a flat surface according to the present invention is used, a film having channels formed not only perpendicularly but also parallel to the substrate surface can be formed, and a film can be formed, which has nanochannels including various functional molecules, polymers, metal nanoparticles, semiconductor quantum dots or quantum wires in a specific direction, and can be used as advanced materials for optical, electronic and photoelectronic applications. In particular, when films formed of porous alumina, porous silica or mesoporous materials have vertical channels, these films are highly useful as membranes for molecular separation.

DETAILED DESCRIPTION

Figure 1:
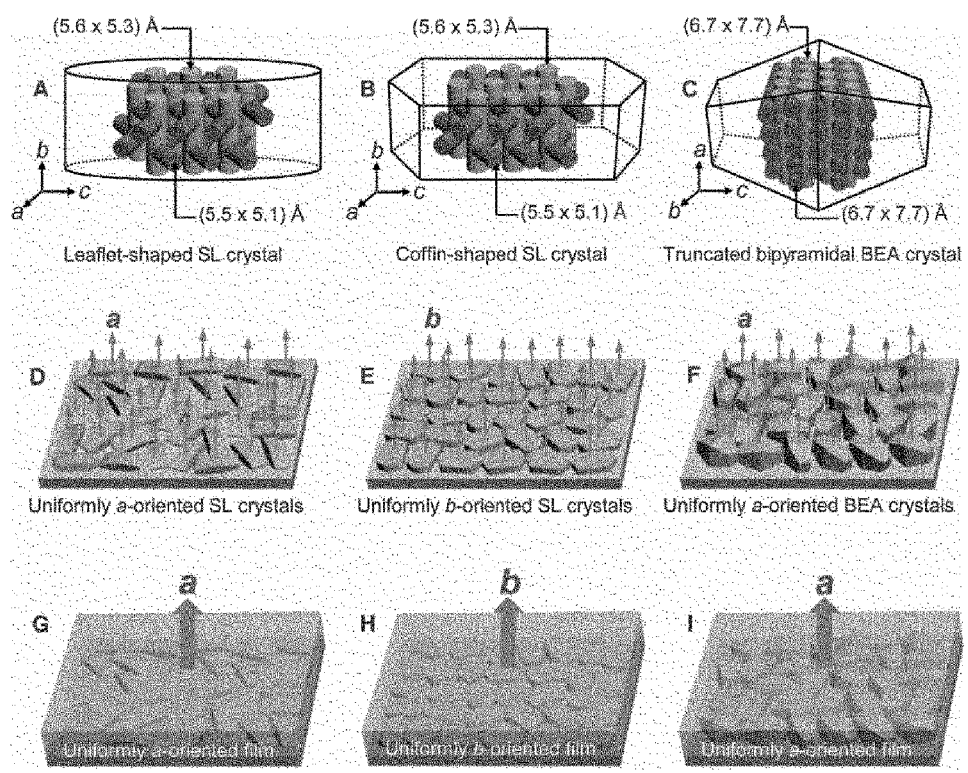
FIG. 1 is schematic illustrations of (A) leaflet-shaped and (B) coffin-shaped SL crystals and (C) truncated bipyramidal BEA crystals and their channel systems, as well as their respective (D) a-oriented, (E) b-oriented, and (F) a-oriented monolayers. (G) to (I) shows that secondary growth on these monolayers produces uniformly oriented films.
Figure 2:
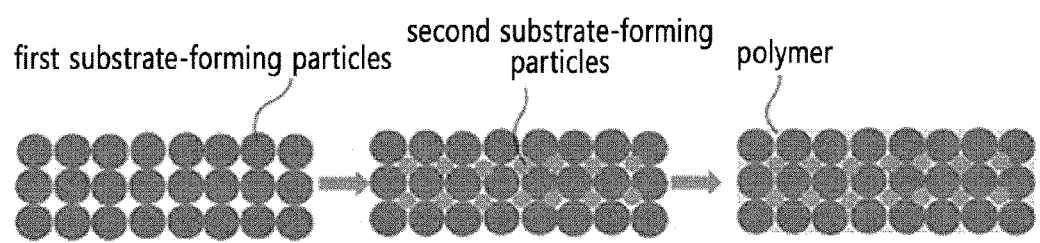
FIG. 2 is a schematic drawing illustrating a process for preparing a substrate according to the present invention.
Figure 3:
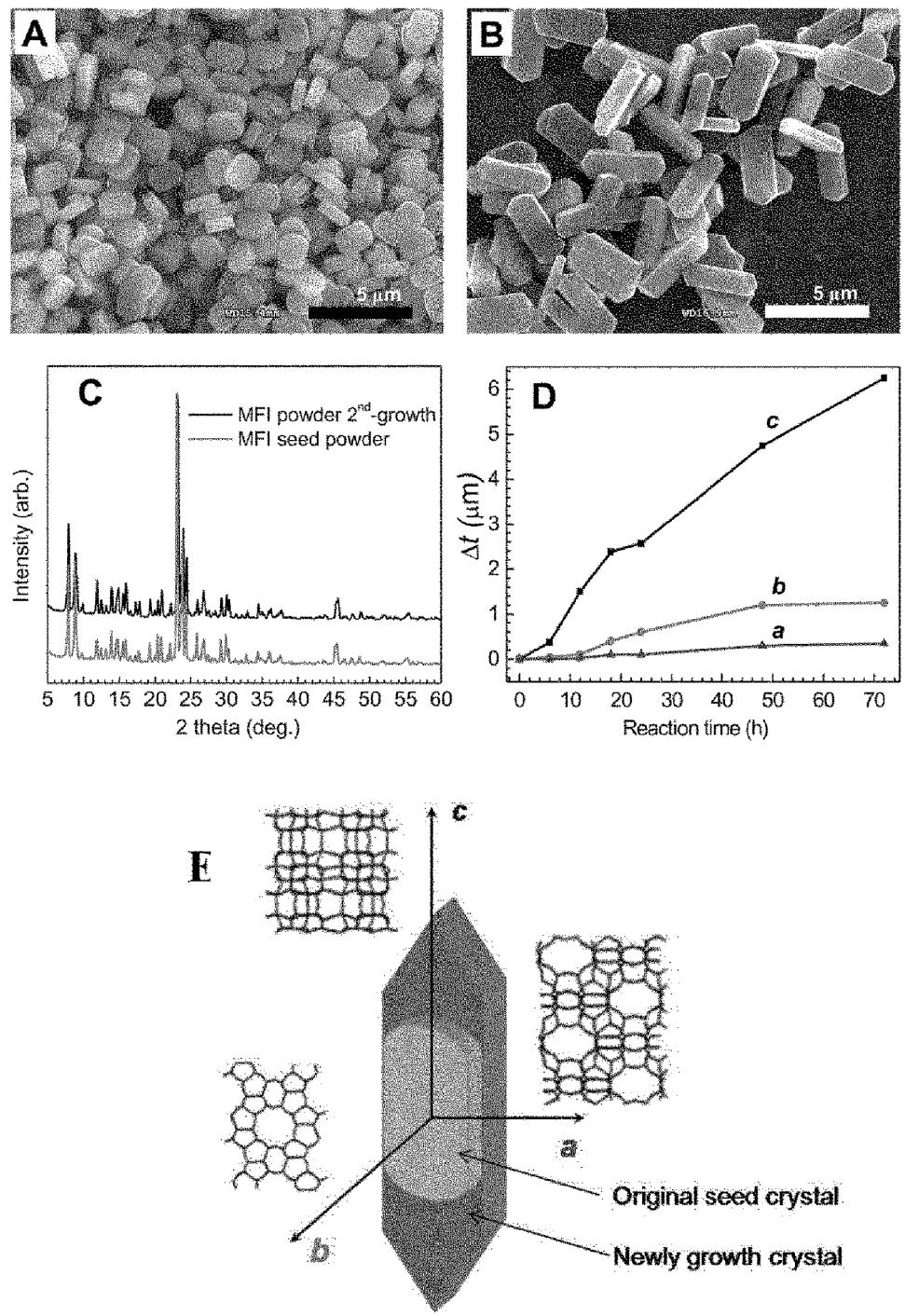
FIG. 3 shows SEM images of leaflet shaped SL seed crystals (A) and the SL crystals grown from the SL seed crystals by secondary growths in Gel-2 (B). (C) represents XRD diffraction patterns of leaflet shaped SL seed crystals and the SL crystals grown from the seed crystals by secondary growth in Gel-2. (D) illustrates the plots of the average length increases of the SL crystals vs. reaction time during the secondary growths of leaflet SL crystals in Gel-2. (E) is an illustration of the morphology change of SL seed crystals after secondary growth.

Hereinafter, the present invention will be described in more detail with reference to examples. However, these examples are for illustrative purposes only, and the scope of the present invention is not limited to these examples.

EXAMPLE 1

Preparation of Porous Silica Substrates

Porous silica substrates were prepared from 50-550 nm sized silica beads which were synthesized according to the Stöber method. For this, 10 g of 350-nm $SiO_2$ beads and 10 g of 550-nm $SiO_2$ beads were mixed together using food mixer. Into the mixed silica beads 0.6 mL of aqueous solution of $Na_2SiO_3$ (0.5% in DDW) was added drop wise and the silica bead mixture was ground for 10 min in food mixer. Porous silica supports were prepared by placing 1.8 g of the above mixture in a home-made stainless steel mold and pressing at the pressure of 150 kgf/cm$^2$. The resulting silica dishes were calcined at 1,020° C. for 2 h with the heating rate of 100° C./h. After cooling to room temperature, both sides of the porous silica disc were polished using a SiC sandpaper (Presi, grit size P800). To make the surface smooth, one side was polished again using a SiC sandpaper (Presi, grit size P1200). The diameter and thickness of the porous silica disc were 20 and 3 mm, respectively. The porosity measured by a mercury porosimeter is 45.5% with the average pore size of 250 nm.

One drop of DDW was dropped onto a porous silica support. Independently, 70-nm silica beads were prepared and calcined at 550° C. for 24 h. The calcinced 70-nm silica beads were gently rubbed on the porous silica supports until the surface became shiny. The shiny porous silica supports were dried overnight at room temperature and sintered at 550° C. for 8 h on a muffle furnace. The temperature was increased to 550° C. during the 8 h period and cooled to room temperature during the period of 4 h. An acetone solution of epoxy resin (10 wt %) was spin coated onto the porous silica at the speed of 3,000 rpm for 15 sec and cured at 80° C. for 30 min.

EXAMPLE 2

Assembly of SL Monolayers on Porous Silica Substrates

Onto the epoxy-coated porous silica supports an ethanol solution of polyethyleneimine (PEI, 0.1%) was spin-coated with the spin rate of 2,500 rpm for 15 sec. Perfect boriented SL crystals (1.0×0.5×1.4 µm$^3$) were assembled on the porous supports by rubbing them onto the supports using a finger. The SL crystal monolayer supported on porous silica is denoted as b-SL$_m$/p-SiO$_2$. The b-SL$_m$/p-SiO$_2$ plates were calcined at 550° C. for 24 h in air on a tubular furnace to remove the organic polymer layers as well as to fix the SL monolayers on the silica supports through the formation of Si—O—Si bonding. The rate of temperature increase was 65° C./h. The rate of temperature decrease was 100° C./h.

The calcined b-SL$_m$/p-SiO$_2$ plates were kept in a constant humidity chamber overnight to allow the plates to absorb H$_2$O. The hydrated b-SL$_m$/p-SiO$_2$ plates were then immersed into an aqueous NH4F solution (0.2 M) for 5 h. The NH4F-treated b-SL$_m$/p-SiO$_2$ plates were immersed in fresh DDW for 1 h and dried at room temperature for 24 h

EXAMPLE 3

Secondary Growth of b-SL$_m$/g Plates in Gel-2
(Preparation of Perfect b-oriented SL Film on Porous SiO$_2$ A gel consisting of TEOS, TEAOH, (NH$_4$)$_2$SiF$_6$, and H$_2$O (denoted Gel-2) was prepared, where the molar ratio of the gel was 4.00:1.92:0.36:n2, where nz=40-80. The gel was prepared as follows:

(I) Preparation of the TEOS/TEAOH solution (solution I): TEAOH (35%, 20.2 g) and DDW (22.2 g) were sequentially added into a plastic beaker containing 31.8 g of TEOS (98%). This beaker containing the above solution was tightly covered using plastic wrap and magnetically stirred for about 30 min until the solution became clear.

(II) Preparation of the TEAOH/(NH$_4$)$_2$SiF$_6$ solution (solution II): TEAOH (35%, 10.1 g), (NH$_4$)$_2$SiF$_6$ (2.45 g), and DDW (11.1 g) were introduced into a plastic beaker and stirred until all (NH$_4$)$_2$SiF$_6$ became dissolved.

Solution II was quickly poured into the solution I with vigorous stirring. The mixture solidified immediately. The solidified mixture was stirred for an additional 2 min using a plastic rod, and aged under a static condition for 6 h. After aging, the semisolid gel was ground using a food mixer and transferred into a Teflon-lined autoclave.

b-SL$_m$/p-SiO$_2$ plates were placed vertically in Gel-2. The hydrothermal reactions were carried out at 165° C. for 18 h. After the reaction, the perfectly b-oriented SL films supported on porous SiO$_2$ substrates (denoted as b-SL$_f$/p-SiO$_2$) was produced and then washed with copious amounts of DDW. To remove the alkali in the porous SiO$_2$ support, the b-SL$_f$/p-SiO$_2$ membranes were immersed in DDW for 2 h and subsequently in a NH4F solution (0.2 M) for 4 h. The membranes were then washed with DDW, dried by blowing N2 gas, and kept at room temperature for 24 h. Finally they were calcined at 440° C. for 8 h in air to remove TEAOH template. The heating rate was 60° C./h and the cooling rate was 90° C./h. The calcined membranes were kept in a desiccator for permeation test.

EXPERIMENTAL EXAMPLE 1

Laser Scanning Confocal Microscope (LSCM) Measurement

The LSCM measurements were carried out with two types of membrane including random oriented silicalite-1 films supported on porous silica substrates (denoted as r-SL$_F$p-SiO$_2$) and b-SL$_f$/p-SiO$_2$. The calcined membranes were mounted on a home-made permeance cell. The zeolite site was contacted to pure MeOH while the support site was contacted to fluorescein (see below) solution 0.1 M in MeOH. The contact areas were sealed by O-ring. After 4 days for dye inclusion at room temperature, the membranes were removed and washed with copious amount of MeOH, dried by blowing N$_2$ gas, and kept at room temperature for 12 h.

The LSCM measurements were conducted using LSM-710 (Carl Zeiss) with Argon laser source (488 nm) and z-stack scan mode. The r-SL$_F$/p-SiO$_2$ membrane was measured at laser power of 3.5% using Plan-Apochromat 40x/0.95 Korr M27 objective lens with a zoom value of 0.6 and a master gain value of 547. The b-SL$_f$/p-SiO$_2$ membrane was measured at a laser power of 6.5% using Plan-Apochromat 40x/0.95 Korr M27 objective lens with a zoom value of 2.0 and the master gain value of 700. The 3D images were built using ZEN 2009 Light Edition software (Carl Zeiss).

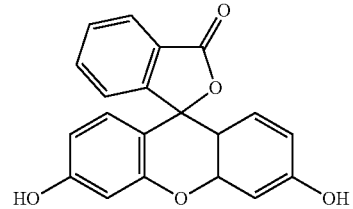

Chemical Formula 1

[2-(6-hydroxy-3-oxo-(3H)-xanthen-9-yl) benzoic acid]
Absorption maximum: 496 nm

EXPERIMENTAL EXAMPLE 2

Separation of the o-/p-xylene Mixture with b-SL$_f$/p-SiO$_2$

Figure 5:
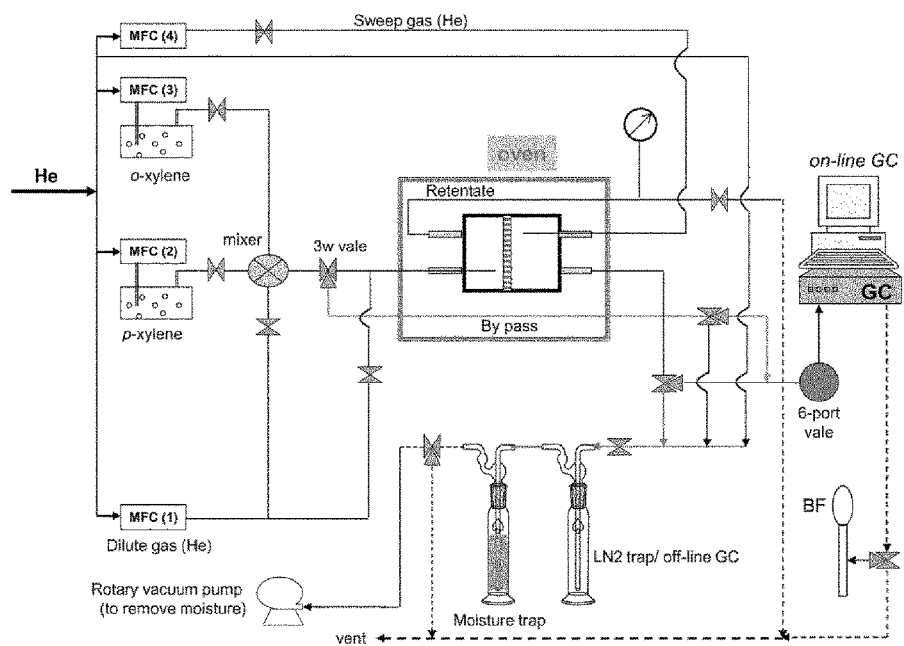
FIG. 5 is a schematic illustration of the set-up used in our work to test the p-/o-xylene separation performance of the membranes.

The separation of the xylene mixture was carried out according to the Wicke-Kallenbach method (FIG. 5). A b-SL$_f$/p-SiO$_2$ membrane was mounted on a home-made stainless steel cell. AS-568A O-rings (Kalrez, DuPont Performance Elastomers) were used as the sealing materials. The active area was 2.0 cm$^2$. Helium was passed through the xylene mixture placed in a container whose temperature was kept at 25° C. This vapor stream was mixed with a second He stream in a mixer. This xylene vapor was fed into the feed side of the membrane. The total flow rate in the feed side was maintained at 60 mL/min. The p- and o-xylene vapor pressures in the feed side were 0.32, and 0.31 kPa, respectively. Helium with a flow rate of 15 mL/min was used to sweep the permeate side. The total pressure on both sides was atmospheric pressure. The separation cell was mounted in a convection oven. To prevent the condensation, all the lines of the system were kept at 110° C. by tape heater. The permeance tests were conducted at a desired temperature to which the temperature was increased slowly at the rate of 1° C./min from room temperature. A fresh membrane was used for each test at different temperatures. During the temperature increase, pure He gas was passed to both sides of the membrane.

For permeance measurements, the gas stream of the permeate side was passed to a GC through a 6-port valve. The concentrations of the components (p- and o-xylene) were analyzed by the GC chromatogram areas. The area-concentration curve was obtained before the membrane tests for each component by passing reference streams of He with different concentrations of each component.

The permeance (P in mole $s^{-1}m^{-2}Pa^{-1}$) is defined as the flux (F in mole $s^{-1}m^{-2}$) of a component M over the difference in the partial pressure of M between the feed and permeate sides (eq. 1).

$$P = F/\Delta p \qquad (1)$$

The separation factor ($\alpha_{P/O}$) is defined as the ratio of the mole fractions of the para isomer ($f_p$) with respect to the ortho isomer ($f_o$) at the feed and permeate sides (eq. 2).

$$\alpha_{P/O} = [(f_p/f_o)]_{permeate}/[(f_p/f_o)]_{feed} \qquad (2)$$

Experimental Results

Figure 4:
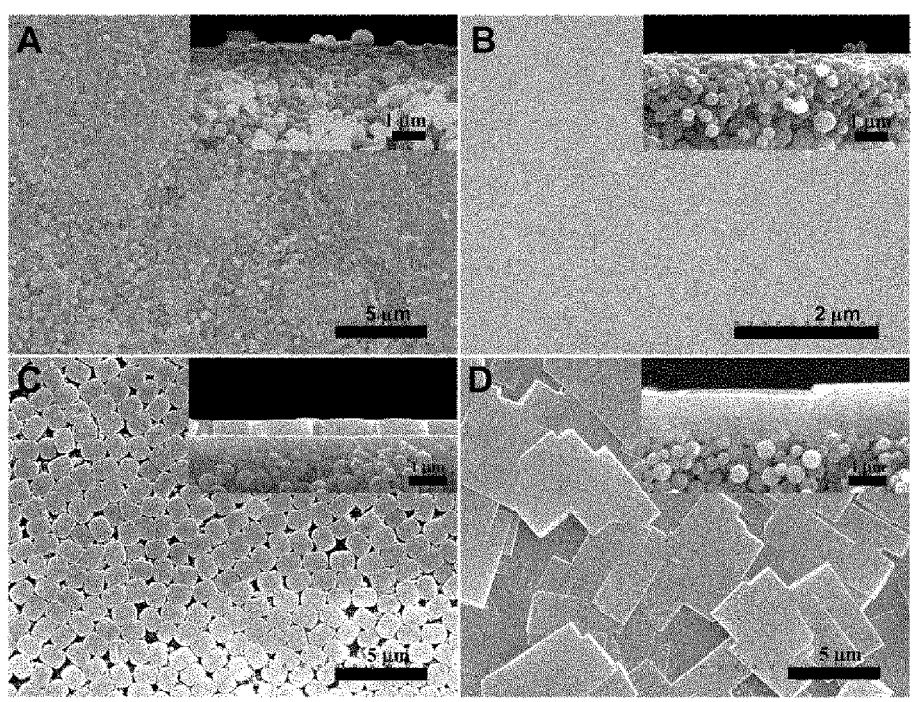
FIG. 4 shows (A) top SEM views of a typical porous substrate (3 mm) composed of a 1:1 mixture of 350 nm and 600 nm silica beads prepared by pressing (150 kgf cm$^{-2}$) for 30 s and calcining at 1,020° C. for 2 h (A) after surface polishing and (B) after additional rubbing its surface with 70-nm silica beads followed by calcination at 550° C. for 8 h. (C) shows SEM images of b-oriented SL monolayer assembled on porous silica supports and (D) shows b-oriented continuous SL film supported on porous silica supports prepared by the secondary growth of the monolayer in Gel-2 at 165° C. for 18 h.

Zeolite films prepared according to the specific embodiment of the present invention can be used in membrane-mediated separation of small molecule mixtures into pure components. To investigate the performance of uniformly b-oriented SL films as separation membranes for xylene mixture, we prepared monolayers of rounded coffin-shaped SL crystals on porous silica supports and subsequently grew 1.0-μm thick uniformly b-oriented SL films in gel-2 (FIG. 4). The use of porous silica supports is necessary to maintain uniform b-orientation of the SL films, because aluminum-containing porous supports suppress the film growth. The porous silica supports were readily prepared by the method described in Example 1. The separation of the o- and p-xylene mixture was conducted at two different temperatures (80° C. and 150° C.) under standard reported conditions (FIG. 5).

Figure 6:
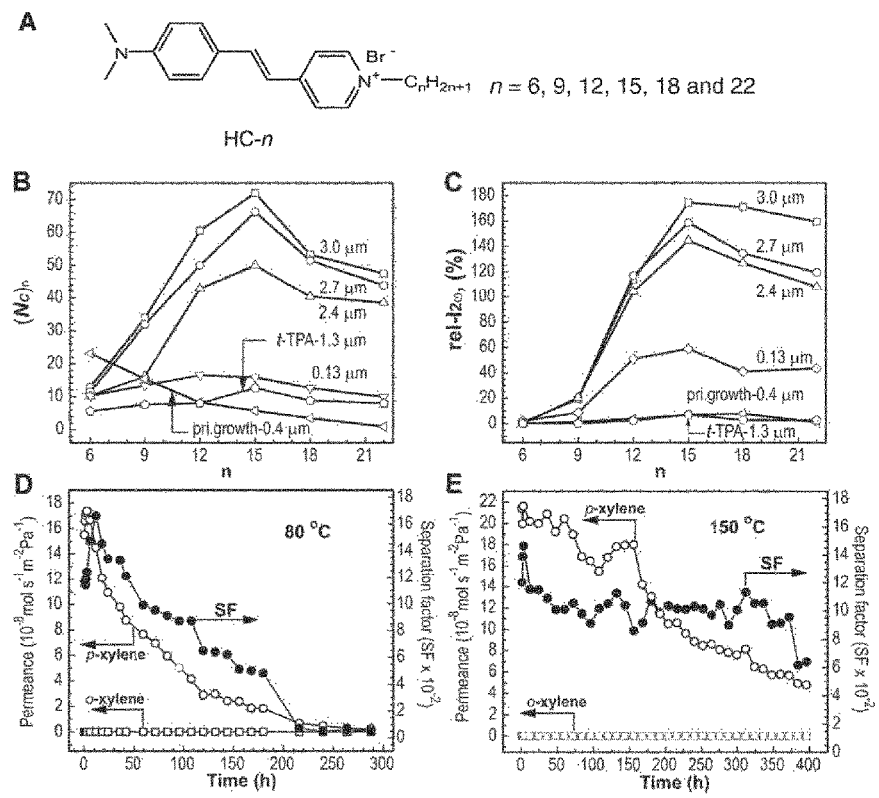
FIG. 6 shows (A) structure of HC-n dyes and (B) Plots of the number of HC-n dyes incorporated in a single channel $(Nc)_n$ of the SL film versus the alkyl chain length n of the HC-n dye. (C) shows plots of the relative second harmonic intensity (rel-$I_{2\omega}$) of the HC-n-incorporating SL films (of indicated thickness) with respect to a reference (3-mm-thick Y-cut quartz) versus the alkyl chain length n of the HC-n dye. Below are plots of permeances of p-(open circle) and o-xylene (open square) and the SF with time for the two operation temperatures, (D) 80° C. and (E) 150° C.

The initially measured permeance of p-xylene at 80° C. was much higher than that of o-xylene, giving rise to a high (>1900) separation factor (SF) (FIG. 6D). However, the permeance continuously decreased over a period of 216 hours and reached a steady state. The steady-state permeance of p-xylene and o-xylene were $0.7 \times 10^{-8}$ and $0.0092 \times 10^{-8}$ mol $s^{-1}m^{-2}Pa^{-1}$, respectively, giving rise to a steady-state SF of 71. We attribute the continuous decreases of p-xylene permeance and the SF value to gradual adsorption of o-xylene into the channels, leading to a gradual increase in the degree of channel blockage, which in turn decreases the diffusion rate of p-xylene molecules. The fact that the permeance decreases to near zero also indicates that the b-oriented SL film does not have cracks.

At 150° C., the p-xylene permeance also continuously decreased from $21.6 \times 10^{-8}$ to $5 \times 10^{-8}$ mol $s^{-1}m^{-2}Pa^{-1}$ over a period of 400 hours (FIG. 6E). During the same period, the o-xylene permeance decreased from $0.0097 \times 10^{-8}$ to $0.0068 \times 10^{-8}$ mol $s^{-1}m^{-2}Pa^{-1}$. The gradual decrease of p-xylene permeance even at 150° C. indicates that the channel blocking by o-xylene still continues at 150° C., and the b-oriented SL film does not undergo crack formation during operation. During the period from 20 to 370 hours, the SF value remained nearly constant at ~1000. Although this steady-state SF value is lower than the highest value observed from randomly oriented tubular SL films, it is about two times higher than those of randomly oriented non-tubular SL films with similar thickness (table 1).

TABLE 1

| Orientation | Thickness [μm] | p-xylene permeance [$10^{-10}$ mol $s^{-1}$ $m^{-2}$ $Pa^{-1}$] | SF | Temp. [° C.] | Calcination method |
|---|---|---|---|---|---|
| random (Ref. 1) | 0.5 | 2,700 | 17 | 400 | C |
| b (Ref. 2) | 1.0 | 2,460 | 378 | 150 | C |
| b (Ref. 2) | 1.0 | 1,960 | 483 | 200 | C |
| random (Ref. 3) | — | 270 | 60 | 150 | C |
| random (Ref. 4) | — | — | ~5,000 | 200 | — |
| b (the present invention) | 1.0 | 2,100-500 | ~1,000 | 150 | C |

(Ref. 1) J. Hedlund, F. Jareman, A. J. Bons, M. Anthonis, J. Membr. Sci. 222, 163 (2003).
(Ref. 2) Z. P. Lai, M. Tsapatsis, J. R. Nicolich, Adv. Funct. Mater. 14, 716 (2004).
(Ref. 3) C. J. Gump, V. A. Tuan, R. D. Noble, J. L. Falconer, Ind. Eng. Chem. Res. 40, 565 (2001).
(Ref. 4) M. O. Daramola et, al., Sep. Sci. Technol. 45, 21 (2009).

Table 1 indicates the comparison of the characteristics and performance of the uniformly b-oriented SL membranes prepared by method of the present invention with the SL membranes prepared by other groups. SF represents Separation factor, and the conventional slow temperature rising and slow temperature cooling method is used as Calcination method (C).

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a substrate, at least one surface of which is partially or entirely flat, the method comprising:
    forming a substrate by first substrate-forming particles;
    placing a second substrate-forming particles on the surface of the substrate formed by the first substrate-forming particles;
    applying pressure to the second substrate-forming particles to be insert into the first pores formed among the first substrate-forming particles, followed by calcinations;
    coating the surface of the calcined substrate with a solution of the polymer, thereby filling some or all of second pores remaining in a portion filled with the second substrate-forming particles; and
    heating the polymer-coated substrate to evaporate the solvent or cure the polymer.

2. The method of claim 1, wherein at least one surface of the substrate is flat to allow non-spherical seed crystals to be aligned such that one or more or all of a-axes, b-axes and c-axes of the seed crystals are oriented according to a predetermined rule.

3. The method of claim 1, wherein the first substrate-forming particles have an average particle size greater than that of the second substrate-forming particles.

4. The method of claim 1, wherein one or more second substrate-forming particles are filled in each of the first pores generated by the first substrate-forming particles.

5. The method of claim 1, wherein the first substrate-forming particles and the second substrate-forming particles are independently selected from ordered porous materials.

6. The method of claim 1, wherein the first substrate-forming particles and the second substrate-forming particles are independently porous silica.

7. The method of claim 1, wherein the polymer has a hydroxyl group or is treatable to have a hydroxyl group on a surface thereof.

8. A method of preparing a substrate complex, the method comprising:
preparing a substrate according to claim 1; and
aligning non-spherical seed crystals on a flat portion of at least one surface of the substrate such that one or more or all of a-axes, b-axes, and c-axes of the seed crystals are oriented according to a predetermined rule.

9. A method for preparing a thin film or a thick film, the method comprising:
(1) preparing a substrate according to claim 1;
(2) aligning non-spherical seed crystals on a flat portion of at least one surface of the substrate such that one or more or all of a-axis, b-axis and c-axis of the seed crystals are oriented according to a predetermined rule; and
(3) exposing the aligned seed crystals to a solution for seed crystal growth, and forming and growing the film from the seed crystals by a secondary growth method.

10. The method of claim 9, wherein the solution for seed crystal growth used in step (3) comprises a structure-directing agent.

11. The method of claim 9, wherein the seed crystals in step (3) grow vertically from the surface thereof by secondary growth to form a three-dimensional structure while being connected to one another two-dimensionally, thereby forming the film.

12. The method of claim 9, wherein the seed crystals are selected from ordered porous materials.

13. The method of claim 9, wherein the seed crystals in step (2) are aligned such that all the a-axes of the seed crystals are oriented parallel to one another, all the b-axes of the seed crystals are oriented parallel to one another, all the c-axes of the seed crystals are oriented parallel to each other, or a combination thereof.

14. The method of claim 13, wherein the a-axis, b-axis or c-axis of the seed crystals is oriented normal to the substrate surface in step (2).

15. The method of claim 9, wherein the film, formed in an area in which the orientations of the axes of seed crystals adjacent to one another are uniform, has : (a) channels that are continuously connected to one another and extend in an axial direction parallel to the substrate surface;
or (b) channels that are continuously connected to one another and extend in an axial direction perpendicular or inclined with respect to the substrate surface; or (c) both the channels of (a) and the channels of (b).

16. The method of claim 9, wherein the seed crystals and the formed film is a zeolite or a zeotype molecular sieve.

17. The method of claim 9, wherein step (2) is achieved by placing the seed crystals on the substrate, and then aligning the orientation of the a-axis, b-axis, or c-axis of the seed crystals by physical pressure.

* * * * *